United States Patent
Nightingale

(10) Patent No.: US 7,204,930 B2
(45) Date of Patent: Apr. 17, 2007

(54) WATER PURIFICATION SYSTEM AND METHOD

(75) Inventor: William Nightingale, Mt. Vernon, WA (US)

(73) Assignee: Skagit Farmers Supply, Burlington, WA (US)

( * ) Notice: Subject to any disclaimer, the term of this patent is extended or adjusted under 35 U.S.C. 154(b) by 0 days.

(21) Appl. No.: 11/184,188

(22) Filed: Jul. 18, 2005

(65) Prior Publication Data

US 2006/0011553 A1 Jan. 19, 2006

Related U.S. Application Data

(60) Provisional application No. 60/588,677, filed on Jul. 16, 2004.

(51) Int. Cl.
*C02F 1/74* (2006.01)

(52) U.S. Cl. .................. 210/741; 210/709; 210/722; 210/744; 210/758; 210/793; 210/86; 210/90; 210/96.1; 210/104; 210/108; 210/111; 210/140; 210/143; 210/203; 210/277

(58) Field of Classification Search .............. 210/722, 210/108
See application file for complete search history.

(56) References Cited

U.S. PATENT DOCUMENTS

| | | | |
|---|---|---|---|
| 630,988 | A | 8/1899 | Reisert |
| 1,119,008 | A | 12/1914 | Gibson |
| 2,879,891 | A | 3/1959 | Beohner et al. |
| 3,111,486 | A | 11/1963 | Soriente |
| 3,342,334 | A | 9/1967 | Soriente et al. |
| 3,502,212 | A | 3/1970 | Ueda |
| 3,549,012 | A | 12/1970 | Mackrie et al. |
| 3,649,532 | A * | 3/1972 | McLean .................. 210/718 |
| 3,825,120 | A | 7/1974 | Takahashi |
| 3,841,485 | A | 10/1974 | Malkin |
| 4,229,292 | A | 10/1980 | Mori et al. |
| 4,317,733 | A | 3/1982 | Xhonneux |
| 4,537,687 | A | 8/1985 | Piper |
| 4,659,463 | A * | 4/1987 | Chandler et al. ........ 210/202 |

(Continued)

*Primary Examiner*—Peter A. Hruskoci
(74) *Attorney, Agent, or Firm*—Matthew W. Jellett; Huges Law Firm, PLLC

(57) ABSTRACT

An oxidation filtration system for cleaning groundwater, the system having an aeration tower and a filtration tank. Within the filtration tank is an upper chamber and a lower chamber. Contained within the lower chamber is a plurality of Styrofoam™ filter media. Separating the upper chamber from lower chamber is a filter media mash which keeps the filter media from entering into the upper chamber. The aerated water from the aeration tower enters into the base of the lower filter chamber and rises through the filter media into the upper filter chamber. As the water passes through the filter media, the dissolved solvents fallout of the groundwater and attach themselves to the Styrofoam™ media. An automated back flushing and clarifying process is also provided using a back flush port and a clarification port, a higher level water sensor in the aeration tower and a programmable logic controller. The controller opens and closes the back flush and clarification port depending on the settings within the resident software, the controller interfaces with a remote computer to remotely operate the back flushing, clarification and filtering of the groundwater. The controller receives signals from the sensor to determine emergency back flushing requirements. The controller operates at a minimum one, and maximum five oxidation filtration systems at one time.

19 Claims, 10 Drawing Sheets

U.S. PATENT DOCUMENTS

| | | | |
|---|---|---|---|
| 4,885,083 A * | 12/1989 | Banks | 210/108 |
| 5,096,580 A * | 3/1992 | Auchincloss | 210/202 |
| 5,096,596 A * | 3/1992 | Hellenbrand et al. | 210/721 |
| 5,147,530 A * | 9/1992 | Chandler et al. | 210/90 |
| 5,705,054 A | 1/1998 | Hyrsky | |
| 5,997,750 A * | 12/1999 | Rozelle et al. | 210/744 |
| 6,063,269 A | 5/2000 | Miller et al. | |
| 6,103,108 A * | 8/2000 | Kohlenberg | 210/120 |
| 6,187,178 B1 | 2/2001 | Lecornu et al. | |
| 6,638,422 B1 * | 10/2003 | Schwartzkopf | 210/108 |

* cited by examiner

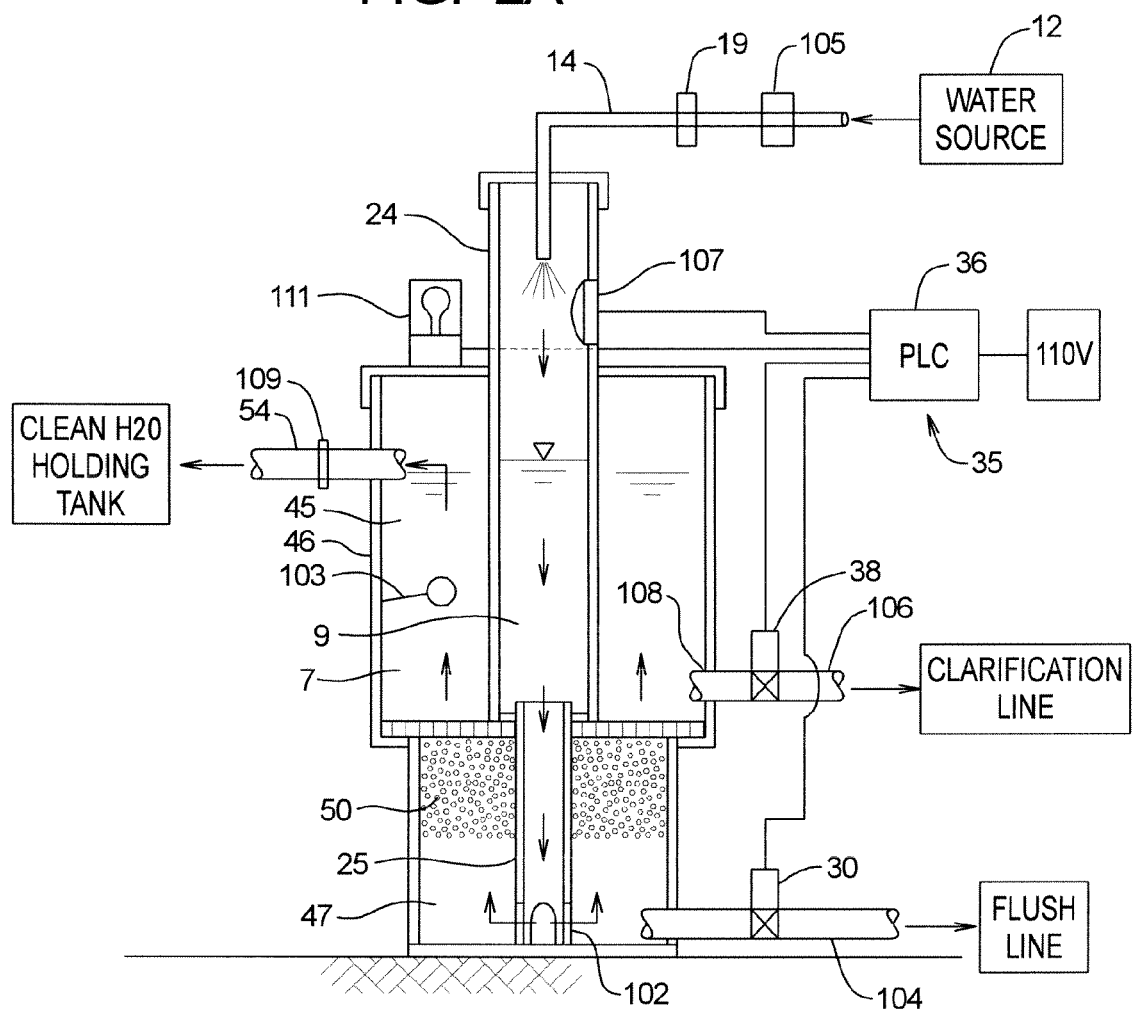

WATER PURIFICATION SYSTEM AND METHOD

RELATED APPLICATIONS

This application claims priority benefit of U.S. Ser. No. 60/588,677, filed Jul. 16, 2004.

BACKGROUND OF THE INVENTION a) Field of the Invention

It is very common in rural locations to not have access to municipal utility services including potable water. Many times the water loads required by farms or dairies are such that the municipal services can be overburdened and consequently the dairy or farm may be required to obtain its own water. Generally the farms turn to on-site groundwater or surface water. On-site groundwater is usually un-potable and depending on the geographic location may have soluble iron or manganese due to the lack of dissolved oxygen content.

As is generally known in the art, iron and manganese are common elements widely distributed in nature. In the absence of oxygen, both of these elements are soluble in water. Both elements may form compounds with other soluble elements and can pollute water making it undesirable for human use. An aeration process will help to remove the compounds. The soluble forms of iron and manganese are in the plus two valence oxidation state. Upon contact with oxygen, or any other oxidizing agents, both the ferrous iron and manganese are oxidized to higher valences, forming new ionic complexes which are not soluble to any appreciable extent. Therefore, with the addition of oxygen to the compound, the iron and manganese may be removed as a precipitate after aeration.

In addition to aeration of the water converting the ferrous iron into a precipitate, chemical oxidants such as potassium permanganate can also be used. These chemical oxidants may sometimes be used in connection with an aeration process to increase processing speed.

Iron particularly poses problems including taste, staining, and accumulation within the pipes themselves. Iron will generally cause a reddish-brown staining of laundry, porcelain, dishes, utensils, teeth and even glassware. Further, the iron will over time settle out and buildup deposits in pipelines, pressure tanks, water heaters, and water softeners. Thus there are associated increases in energy costs and maintenance costs for removal of the iron deposits. In dairies the iron content will directly contaminate the cows and limit milk output.

To remove the soluble iron from the water an oxidation and filtration process is used. Filtering systems of this sort are generally comprised of two separate categories, the actual filtration process through which the water is cleaned and the backwashing operation through which the filter is cleaned. These operations are equally important in the overall filtration process. The most common practice for filtration is to use gravity filtration in a downward mode, but several other modes of operation are possible including up-flow, by-flow, and pressure or vacuum filtration.

During the filtration process, the water is injected with oxygen and the soluble iron content oxidizes. The oxidized water is then filtered through a filter media, generally either by using a greensand glauconite (for gravity flow modes) or, a buoyant manufactured filter media (used in up-flow modes).

In either case, the filter media will accumulate large amounts of insoluble iron content and the buildup must be removed by backwashing.

The backwashing process must be performed on a regular basis, such as every other day or biweekly depending upon the size of the operation.

With proper backwashing, the filtration process will successfully remove approximately 90% to 95% of the soluble iron content out of the source water. The filtered water is then treated to remove the remaining 5% to 10% of the soluble iron content.

To initiate backwashing, many of the filtration systems utilize a siphoning process to initiate the backwashing. The siphoning system is generally an automated process. The siphoning process requires constant servicing and adjustments.

When the pipes themselves are fully operable and not clogged with iron deposits, the automatic hydraulic siphoning system works well. But, after continuous use the pipe components tend to accumulate the iron content and consequently, reduced flow capacity and additional weight on the pipes themselves throws the siphoning system off-balance. Thus, continuous maintenance and servicing is generally required. This constant servicing can pose a hardship on the rural farms and dairies which are operating under tight financial constraints as well as posing logistical maintenance and servicing problems.

In summary, an oxidation/filtration/backwash system to remove soluble iron or manganese content from source groundwater utilizing an improved backwashing system as well as an assembly of interchangeable and self serviceable components is strongly needed.

b) Background Art

Generally the most common practice for filtration is the gravity filtration in a downward mode, but several other modes of operation are possible including up-flow, by-flow, and pressure or vacuum filtration. Listed below are various filtration devices with emphasis on back flushing.

U.S. Pat. No. 6,187,178 (Lecornu et al.) shows a filter with several back flow means including a siphon. There is an air bleed included which insures the siphon being broken at the proper point.

U.S. Pat. No. 6,063,269 (Miller et al.) shows a filter in a hydraulic system in which a portion of the fluid in the return line, is drawn by Venturi, to the filter line.

U.S. Pat. No. 5,705,054 (Hyrsky) provides a filtered water in-take in which water flows out through pipe. If intake is blocked, flow through siphon tubs brings water in through intake. There is a tube which can be used for siphon control.

U.S. Pat. No. 4,537,687 (Piper) discusses a filter which is cleaned by back flushing. This device shows a reverse siphon started by the application of a section port to initiate a backflow siphon flow in tube.

U.S. Pat. No. 4,317,733 (Xhomnneux) shows a filter with a body and a backflow washing means including a siphon tube. The siphon tube causes the flow of fluid to go backwards. The siphon starts when filter is clogged and the fluid in the chamber reaches a particular level.

U.S. Pat. No. 4,229,292 (Mori et al) discloses a regenerating column which is provided with a flushing siphon that starts when the flushing fluid reaches the desired level. The regeneration operation is started by an operator rather than being an automatic means.

U.S. Pat. No. 3,841,485 (Malkin) shows in a siphon system which has back pressure increases a siphon is developed through a pipe which draws fluid through pipes to draw water through the filter element. There is a siphon breaker tube provided to stop the back flow.

U.S. Pat. No. 3,825,120 (Takahashi) shows a system which includes pump means for moving the fluid being handled. In addition to the pumps there is a siphon pipe means which passes fluid to container.

U.S. Pat. No. 3,549,012 (Mackrle) shows a system in which under cleaning conditions a siphon starts when fluid in it reaches the proper level and air control valves are closed. The suction developed by the siphon is applied to a second siphon to clear an upper section.

U.S. Pat. No. 3,502,212 (Ueda) provides a siphon tube which is filled by liquid as the filter clogs. There are also air flow and feeding means that controls the start and end of the cleaning cycle. When the cleaning cycle is started a siphon liquid flowing draws both liquid and filtered material to a drain.

U.S. Pat. No. 3,342,334 (Soriente et al.) show a filter system in which during the cleaning operation a valve is opened and flushing fluid flows down a pipe. U.S. Pat. No. 3,111,486 (Soriente) shows a back flow system in which liquid is delivered by a tube. When the filter is blocked fluid accumulates so that it reaches a point high enough to flow into a siphon and passes out of the filter system drawing the blocking material with it.

U.S. Pat. No. 2,879,891 (Beohner et al.) shows a filter which is provided with a siphon tube that fills when the back pressure caused by filter blockage, and the position of the air control means allow it to fill. When the siphon tube fills it draws fluid backwards through tubes and backwards through the filter materials and removes it.

U.S. Pat. No. 1,119,008 (Gibson) shows a water filtering system in which there is a pipe loop "L", that appear to serve as a back flow cleaning siphon when valves are set for back washing. The control is in part a function of automatic float or flow control valves.

U.S. Pat. No. 630,988 (Reisert) shows a back flow system in which as the pressure increases liquid flows up pipe "l", and down inner pipe "s", so that a siphon is established.

Ukranian UA 411 (Dmitriyevich) discloses an oxidation/filtration apparatus where as the filtering medium muds the filter loss increases. The water level providing positive flow reaches a maximum height and primes a siphon to initiate rinsing of the filter medium.

BRIEF DESCRIPTION OF THE DRAWINGS

FIG. 2a is an alternative embodiment elevational view of the oxidation, filtration, back flush, system;

DETAILED DESCRIPTION OF THE PREFERRED EMBODIMENTS

A detailed description of a prior art embodiment will now be discussed followed by a detailed discussion of an embodiment of the present invention.

In discussing the present embodiment a description of the existing systems will first be provided.

Figure 1:
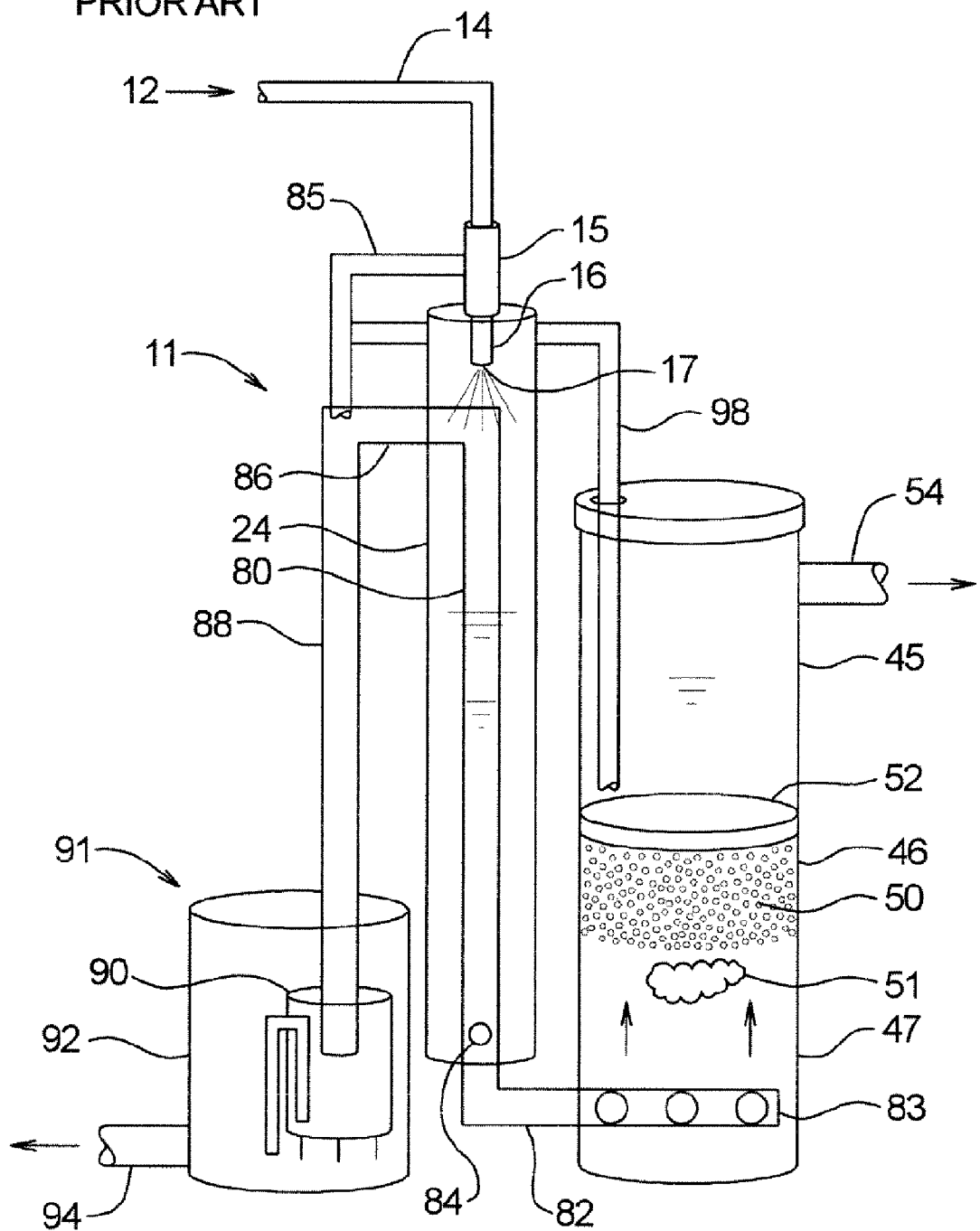
FIG. 1 is an elevation view of a prior embodiment.

As stated above, it is general practice to remove soluble iron from water by utilizing an oxidation/filtration process 11 as shown in FIG. 1. Filtering systems of this sort are generally comprised of two separate categories, the actual filtration process and the back-washing operation to clean the filter.

Still referring to FIG. 1, a common oxidation/filtration system 11 is shown with a filter chamber 46 and a water tower 24. The groundwater 12 is pumped from a groundwater well and fed into a pressurized source line 14. To provide the oxygen, a Venturi-type aerator injector 15 forces compressed air into the groundwater 12, thus creating the first stage of the aeration process. Next, the pressurized water passes through a spray nozzle 16 which disperses the groundwater 12 into a closed water tower 24 completing the aeration process. The water tower 24 is typically cylindrical and stands approximately 20 ft. in height. The aerated water descends to the bottom of the water tower 24, and then it enters into an opening 84 of a cylindrical feed line 80 which is concentric within the water tower 24. The water entering into the opening 84 will flow through a distribution line 82 which directs the water into a manifold 83, the water passes upwardly through the filter chamber 46 in which is positioned a low density filter media 50. At the same time the water is flowing upward through the filter media 50 thus filling the filter chamber 46, the water is also rising in the cylindrical feed line 80.

As the water continues to flow into the filter tank 46, it enters into the upper portion 45 of the filter take 46 and begins to flow out of the clean water outlet 54. There is a screen 52 at about the mid height of the tank 46 which stops the filter media 50 from migrating from the filter tank lower portion 47 into the filter tank upper portion 45.

When efficient filtration occurs the water head in the water tower 24 will stay at approximately constant height, which also results in a constant output of clean water running through the clean water outlet 54 of the filter chamber 46. Thus, as the filtration process 11 continues, particulate filtrate matter 51 will begin to accumulate as it attaches in, around and to the low density filter media 50.

Eventually the filter media 50 will become so congested with the particulate 51 that the backwash operation will engage.

This engagement occurs because as more and more particulate 51 attaches to the filter media 50, the filtration flow decreases and water pressure head in the water tower 24 begins to increase. With the building water pressure in the water tower 24 the height of the water in the cylindrical feed line 80 rises.

The water in the cylindrical feed line 80 will reach the level of the connecting line 86 at the top of the feed line 80 which in turn leads to the discharge line 88. The discharge line 88 extends downwardly into a waste lock basin 90 in a holding tank 92. The flow of the water downward in the discharge line 88 creates the siphon vacuum. This vacuum starts drawing water out of the filter tank 46. As the water drops down in the filter tank 46, exiting the holding tank 92, the level of the water in the filter tank 46 will reach the lower end 96 of the vacuum line 98, or in other words, the upper part 45 of the filter tank 46. With this drop in water level, the vacuum line 98 becomes open to atmospheric pressure, and thus interrupts the siphoning action which is occurring in the discharge line 88. The water remaining in the discharge line 88 drops into the waste lock basin 90 and the water remaining in the cylindrical feed line 80 drops back to the distribution line 82 to restart the filtration process.

As previously stated before, the oxidation filtration system 11 will need to perform the siphoning and back flush process on a regular basis. Over time the ferrous soluble iron content in the groundwater will adhere to the inner regions of the cylindrical feed line 80, the distribution line 82, and tend to clog the feed line opening 84, as well as the discharge openings in the manifold 83. Where the soluble iron content is high, the clogging of these various filtration system components will occur more frequently.

This accumulation requires constant maintenance of the oxidation filtration system 11 and over the long term is more expensive to maintain than the preferred embodiment as discussed below.

Even if operation continues unimpeded, the inner diameter of the cylindrical feed line 80 will tend to decrease in size due to the increase in filtrate particulate 51 accumulation. With a smaller diameter comes a slower flow rate through the distribution line 82 and the cylindrical feed line 80 during the discharge process. Additionally, the many bends and turns in the pipes which comprise the discharge system and siphoning process add a level of complexity to the overall design which is not needed.

Additionally the backwash system itself likely will not carry the heavier filtrate particles 51 which are residing in the bottom of the filter chamber 46 up and over the connecting line 86. This tends to leave filtrate particulate 51 accumulations in the elbow between the cylindrical feed line 80 and the distribution line 82. Lastly, immediately after the back flushing process has occurred the groundwater 12 which begins to accumulates and flow upwards starting at the filter tank lower portion 47 and flowing upwards through the low density filter media 50 finally passing through the screen 52, will be cloudy due to the violence turbulence associated with the back flushing process. This cloud will tend to dissipate over time but in many cases the finer particles will be discharged out of the cleaning water outlet 54 and fed into the potable water lines feeding the residences or dairy buildings. To allow the fine filtrate particulate 51 to settle out, a cleansing or clarification period should be provided.

Within this context, an embodiment of the present concept will now be discussed.

A detailed discussion of a single oxidation filtration system will first be discussed followed by detailed discussion of an assembly of oxidation filtration systems as provided in current embodiment. First referring to FIGS. 2 and 2a, the oxidation filtration system 10 is composed of three main elements: an aeration section 24 also referred to as an aeration tower or water tower 24, a filtration section 46 also referred to as a filtration tank 46, and an oxidation filtration monitoring and cleaning system or flushing system 35. Each of the main components has a series of subcomponents which will be briefly discussed. The aeration tower 24 in the present embodiment is constructed of a 1 foot diameter polyvinyl chloride cylindrical pipe which stands approximately 20 feet in height. The aeration tower 24 has an upper zone 23 and a lower zone 25. The upper zone is configured such that it can accept the outlet 17 of a pressurized groundwater source line 21. Additionally, the lower zone 25 has a close-bottomed portion to keep the groundwater 12 contained. Feeding into the aeration section 23 also referred to as the aeration tower upper zone 23 as previously discussed, is the groundwater source line 21 which holds pressurized groundwater 12 accumulated from the on-site water sources.

The groundwater must be pressured prior to being sprayed into the aeration tower upper zone 23. Pressure is provided from a pressure source, and a pressure meter 20 is attached to the source line 14 so that monitoring of the groundwater pressure can occur. A source line valve handle 19 enables the operator to turn the filtration system 10 on and off as desired. The pressurized water runs through a Venturi-type aerator injector 15 which is attached to the source line 14 near the source line outlet 17. Connected to the end of the source line, is a spray nozzle 16. After running through the Venturi-type aerator 15, the groundwater exits through the spray nozzle 16 which further acts to aerate the groundwater 12 thus converting the soluble ferrous iron content into a nonsoluble form, completing the oxidation portion of the process and allowing the particulate ferrous content 51 as described further herein to drop out of the groundwater 12.

Figure 2:
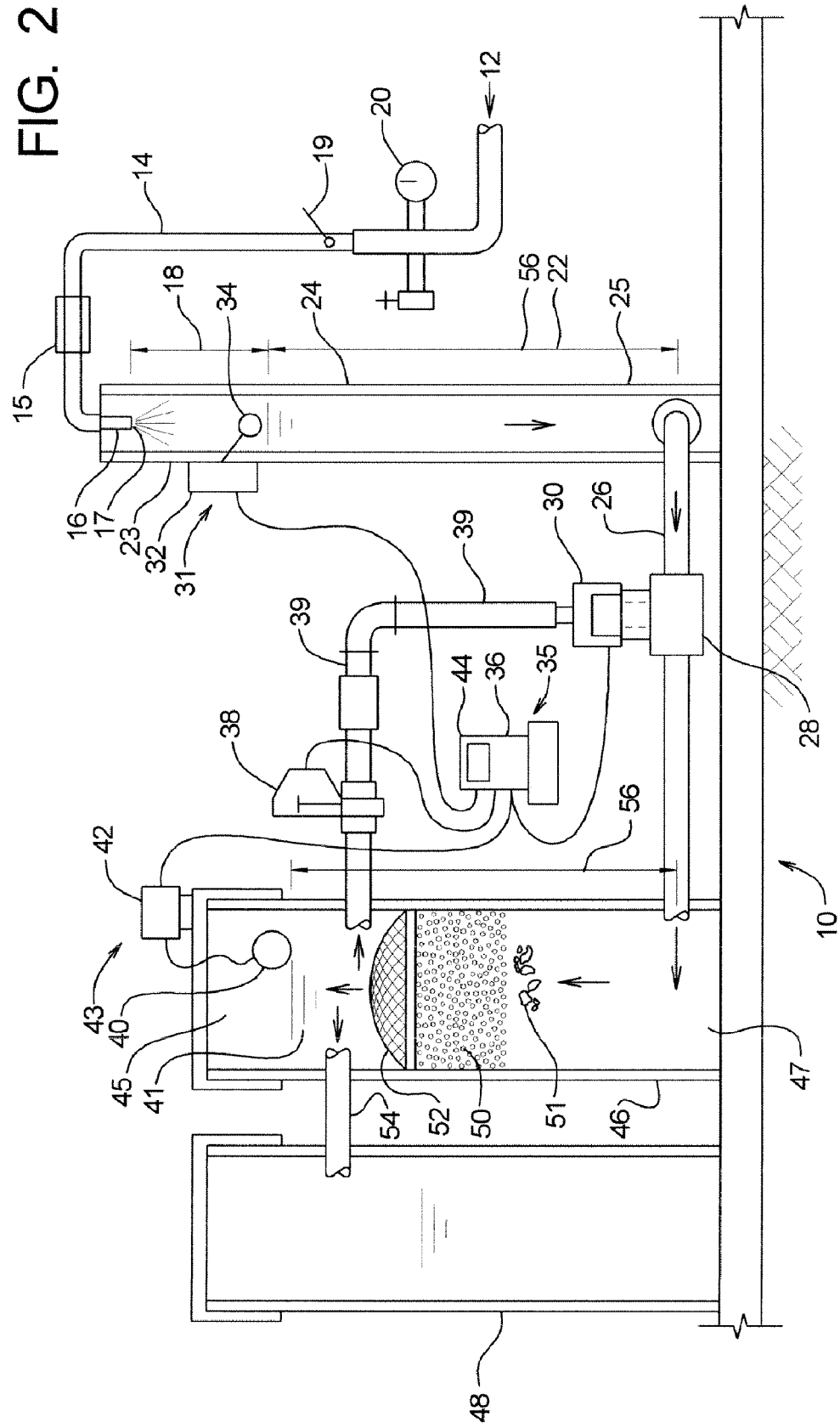
FIG. 2 is an elevation view of the oxidation, filtration, back flush, system.

Once the groundwater has been aerated, the ferrous content is ready to drop out of the groundwater upon contact with a medium which has an attracting valence charge. Referring to FIG. 2, connected to the aeration section lower chamber 25 also referred to as the aeration tower lower zone 25 is a source water crossover pipe 26. This crossover pipe feeds the groundwater 12 from the aeration tower into the filtration tank 46. Referring to FIG. 2a, in an alternative embodiment, the aeration tower 24 is positioned within the filtration tank 46. This combination eliminates the need for the crossover pipe 26 as seen in FIG. 2. In this alternative embodiment, the aerated water 9 exits directly out of the aeration tower lower zone 25 and into the filter tank lower zone 47 through an exit port 102.

Referring back to FIG. 2, the filter tank 46 is in the current embodiment constructed of a 3 foot diameter cylindrical polyvinyl chloride housing or pipe and has a filtration section lower chamber 47 also referred to as a filter tank lower zone or lower chamber 47 and a filtration section upper chamber 45 also referred to as a filter tank upper zone or upper chamber 45. In the current embodiment, the filter tank 46 stands approximately 6 feet in height. Approximately mid-height of filter tank 46 is a secured media mesh filter 52, which is essentially a size 10 filter mesh. Contained within the lower chamber 47 is a plurality of low density buoyant filter media 50. In the current embodiment, this filter media is composed of a plurality of very small Styrofoam™ spheres. Each sphere measures approximately 1/100 of an inch in diameter. To provide for effective filtration, in the current embodiment, the volume of the filter media 50 is approximately 30 inches deep and 3 feet in diameter, which corresponds to the inner diameter of the filter tank 46. To contain the water, the filter tank lower chamber 47 has a closed bottom portion which is watertight.

A brief discussion of the pipes or ports associated with the flushing system will now be provided. Part of the overall monitoring and cleaning or flushing system 35 is the opening and closing of various ports or exit and entrance pipes to create the desired turbulence in the filtration tank lower chamber 47 as well as to clarify the dislodged ferrous particulate after the turbulent back flushing.

Referring to FIG. 2, the current embodiment is provided with a plurality of pipes which include the source water crossover pipe 26, the clarifying or cleansing pipe 39, and the back flush pipe 28. Attached to the pipes are a series of control valves or ports. As previously discussed, the crossover pipe 26 is positioned substantially at the bottom of the lower chamber 47 near the floor of the filtration tank 46. Approximately midway between the filtration tank and the aeration tank the back flush pipe intersects the source water crossover pipe at a junction point. At this junction, the back flush pipe 28 is connected to a discharge port 30 also referred to as a back flush valve 30. The back flush valve 30 is a standard automated valve having a weir and a control box which operates the weir.

A clarifying pipe 39 is provided at the filter tank upper chamber to allow cloudy or turbulent water to be drained. The cleansing or clarifying pipe 39 leads from the filter tank upper chamber 45 and connects to the vertically lower back flush pipe 28 at a second junction. The clarifying pipe 39 also has a filtration section clarification port (FSCP) 38 also referred to as a clarifying valve 38, with the same standard automated valve having a weir and control box as the back flush valve.

Referring now to FIG. 2a, the alternative embodiment for the monitoring and cleaning system 35 includes the use of a back flush line 104 and a clarification line 106. In this embodiment, the back flush line and the source water exit port 102 are separated to provide for a simpler operating system. The back flush line 104 is positioned at or near the bottom of the filtration tank 46 in the filtration tank lower chamber 47. Connected to the back flush line 104 is a filtration section discharge port (FSDP) 30 also referred to as a back flush valve 30 having a control box and weir, the control box being electronically operable by the programmable logic controller 36. During normal operation, the back flush valve 30 is in its closed position keeping water within the filter tank 46.

Providing a means of clarifying cloudy groundwater is a clarification line 106 located within the upper chamber 45 of the filter tank. This clarification line also has the clarification valve 38 which operates the same as the back flush valve 30. After the turbulence in back flushing has occurred, a clarifying period is run which allows the finer particulate to settle out.

During normal operational flow the aerated water 9 will generally accumulate in the aeration tower 24 building up a pressure head 22 which drives the corresponding discharge rate out of the filtration tank 46. The discharge rate stays relatively constant based on a discharge pressure which correlates to the pressure head 22 in the aeration tower 24. The filter media 50 has a certain porosity between the actual media particles which will allow for only a maximum flow rate through the filter media 50. The pressure head 22 in the aeration tower 24 will build until the flow rate through this filter media equals the pressure head from the aeration tower. As the filtered water 7 enters into the upper chamber 45 of the filter tank, it accumulates until the top layer of the water reaches the filtered water exit pipe 54. This exit pipe 54 has enough cross-sectional area to maintain a constant volume of filtered water 7 within the filter tank 45 upper chamber.

As a natural consequence of filtering the iron or particulate out of the groundwater, the lower chamber 47 of the filter tank in the filter media 50 will accumulate the filtered particulate until such time as the filtering is ineffective. Also, the particulate will tend to reduce the flow rate through the filter media and the corresponding pressure head 22 will need to increase, thus building the height level of the aerated water within the aeration tower 24.

Many geographic regions have significant amounts of soluble iron or manganese within the groundwater and therefore flushing of the lower chamber 47 of the filter tank can be beneficial for the life expectancy of the oxidation filtration system. There are many ways to monitor and trigger the back flushing of the filtration tank 46. Speaking broadly, these include monitoring of the pressure head 22 as it increases in the aeration tank 24, monitoring the filtered water quality 7 in the upper chamber 46 of the filter tank, monitoring the amounts of soluble compounds in the local groundwater supply to determine an optimal periodic back flushing setting.

To coordinate the sequence of monitoring and cleaning of the oxidation filtration system, an oxidation filtration monitoring and cleaning system 35 is provided that will now be discussed. Referring to FIGS. 2 and 2a, the system utilizes a programmable logic controller in combination with a series of sensors and valves. The sensors monitor the water levels within the aeration tank 24 and the filtration tank 46, and the valves or ports control the opening and closing of the back flush line 104 and the clarification line 106 as well as the water source line 14. The programmable logic controller coordinates the sequencing of opening and closing various valves or ports as well as monitoring the water levels to stay within operational parameters.

Figure 7:
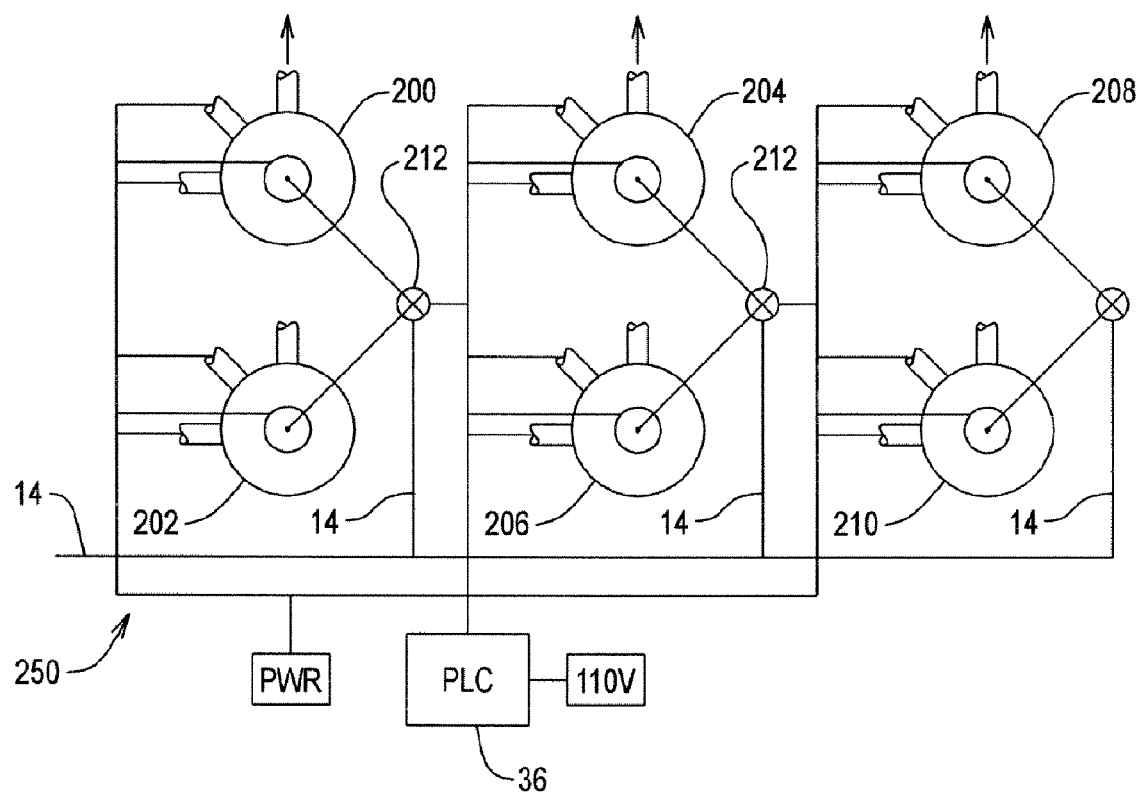
FIG. 7 is a plan view of the oxidation filtration tank assembly.

During the course of filtration, an emergency such as a high-level water sensor may be engaged, the sensor then immediately sends from the PLC a signal to set off the alarm 111 and alert the owners of the system that there is a high water level within the aeration tower 24. The PLC can also operate the solenoid of an oxidation filtration system control valve or port 212 which is designed to alternate the use of an off-line and online oxidation filtration system connected in series. This will be further discussed as seen in FIG. 7 below.

Figure 5:
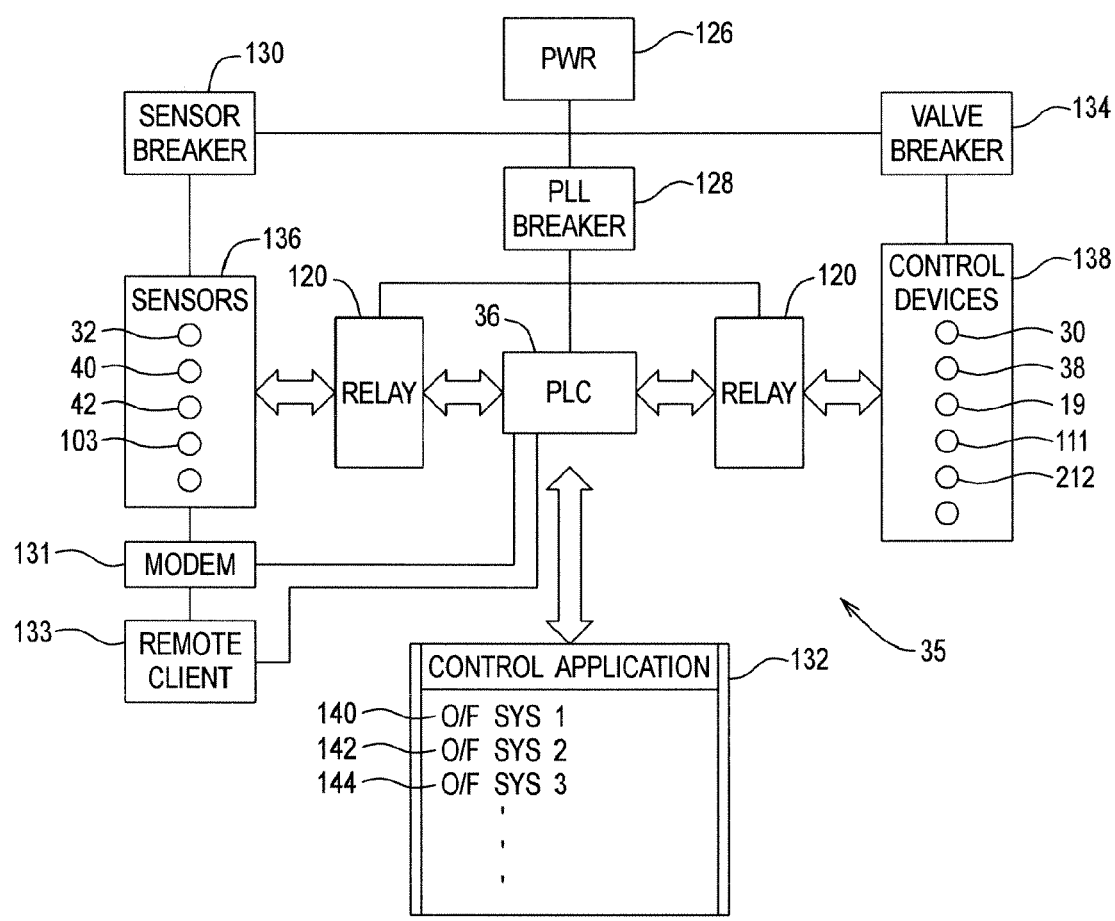
FIG. 5 is a diagram of the programmable logic controller and system elements.

Referring to FIG. 5 for remote operation, the PLC 36 is connected to a communications component or device 131 such as a modem. The modem 131 allows a remote client 133 to connect to the operating system of the PLC 36 and operate the control application 132.

The control application 132 is configured to allow for varying control and sensor settings for the various oxidation filtration systems 10. The control application 132 is configured to operate the controller components including the valves or ports and sensors of the various oxidation filtration systems such as oxidation filtration system applications 1 through 3, FIG. 6.

Because each oxidation filtration system 10 has essentially the same type of sensors 136 and control devices 138, the control application implements a sub-application such as an available oxidation filtration system application 1 140. The sub-application will then draw from a series of control objects 146 as seen in FIG. 6, to implement an instance of the particular control application 132 of the specific system 140.

Of course other programming paradigms may be used such as a non-object-oriented programming language including Basic, Fortran, or an assembly programming language specifically designed for the programmable logic controller.

Figure 6:
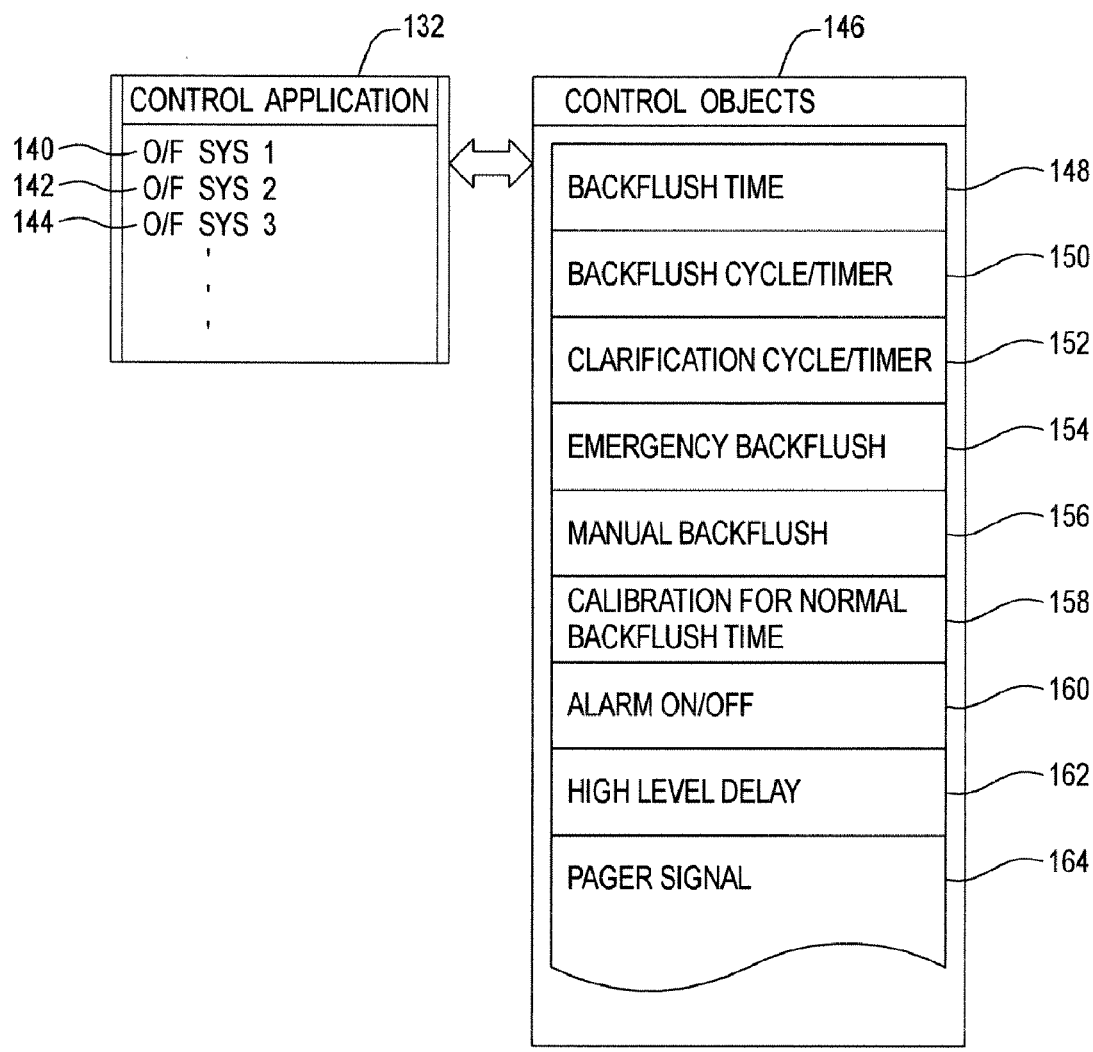
FIG. 6 is a diagram of the control application and control objects.

Still discussing FIG. 6, the functions or objects which run for each system include a back flush time 148, where the back flush time indicates the time of day the oxidation filtration system 10 will initiate a system flush. Referring back to FIG. 2a, the programmable logic controller 36 will send a signal to the back flush port or valve 30 to open the valve and discharge the water in the filtration tank 46 and aeration tower 24. The water in both tanks or sections will provide enough pressure head to turbulently force the water out through the back flush line 104. This turbulence within the lower chamber 47 of the filter section or tank 46 will wash the filtration media 50 of most of the accumulated particulate.

The users can also set a period of time for the back flushing to take place. This is considered the back flush cycle 150. The back flush cycle tells the programmable logic controller 36 how long the back flush valve 30 is to stay open. Similarly, and referring back to FIG. 6, after the back flush has occurred the control application 132 will indicate to the programmable logic controller 36 the amount of time that the clarification port or clarification valve 38 is to remain open so that the system can clarify the water previously back flushed. The clarification period or clarification cycle or timer 152 can be set by the user usually to approximately 20 minutes.

The control objects class 146 also contains a setting for emergency back flush 154. This occurs when one of the high-level sensors within the aeration tower 24 such as the diaphragm sensor 107 as seen in FIG. 2a, signals to the PLC 36 that the pressure head 22 within the aeration tower 24 has increased beyond acceptable limits and the system must be back flushed. Thus the emergency back flush object 154 will signal the programmable logic controller to operate the back flush valve 30 and begin the flushing cycle. Also, a manual back flush object 156 is provided so that the users can either through the remote client 133 or at the display screen of the programmable logic controller 36 operate a manual back flush of the entire filtration system 10.

An additional control object within the control application 132 is a calibration for normal back flush time 158. This calibration for normal back flush time calculates the mean or the average time between the system back flushes, and provides an optimization or recommended setting for the back flush time object 148. This calibration for normal back flush time 158 is beneficial because as previously discussed; each geographic region which requires the oxidation filtration services has different levels of soluble compounds and thus requires different frequencies for washing or cleaning of the filter media 50 as seen in FIG. 2a.

To keep the filtration system running relatively smoothly, a high-level delay object 162 is provided. During the course of operation, the aeration tower 24 may experience high-level water false-starts or in other words false warnings, which have been triggered from splashing or a short period of reduced filtration flow. The high-level delay object 162 allows the user to set the amount of time that the high water float 34 or the diaphragm sensor 107 must be activated or raised before the emergency back flush object 154 will signal the back flush valve 30 to begin the system flush.

To notify the system operator or the owner of the oxidation filtration device that an unscheduled back flushing event has occurred, a series of alarms have been designed to communicate the emergency status. After a signal has been received from one of the sensors 136 as seen in FIG. 5, the control application 132 as seen in FIG. 6, will activate an alarm object 160. The alarm object will then send a control signal to the physical alarm 101 as seen in FIG. 2a which in the current embodiment is attached to the top cover plate of the filter tank 46. The alarm 111 has a flashing warning light as well as a sound/audible warning.

The alarm object 160 has an alarm delay which delays the audible alarm initiation. This delay allows response from the pager alarm discussed below from irritating or annoying residents within the vicinity of the oxidation filtration system. The alarm object 160 will also send a signal through the communications device or modem 131 to a pager service located at a remote client 133 which then notifies the owner of the high-level emergency. The alarm object 160 has an audible silence control which when activated allows the operator to work on the emergency system without the audible alarm causing a distraction. If the high-level emergency is not corrected within a period of time, the audible alarm will then re-activate until such time as the back flush occurs.

In addition to servicing dairy farms and other agricultural operations, the oxidation filtration system 10 can also be used to process groundwater for a small municipality. The current embodiment provides for each filtration unit to process approximately 25,000 gallons to 30,000 gallons per day. An average person will typically use between 75 to 100 gallons of water per day. Therefore, the typical 25,000 gallon processing filtration unit can service approximately 250 people each day. To service between 1,000 people to 2,500 people equating to a small municipality or medium-size subdivision, having between five and ten filtration units running in parallel producing between 125,000 gallons to 250,000 gallons of filtered water each day would be beneficial to the local governmental authority.

The current preferred embodiment for the oxidation filtration tank assembly 250 as seen in FIG. 7 has arranged a three unit filtration output in parallel, with two units for each output line in series. This tank assembly configuration 250 allows the users to perform maintenance on one of the off-line filtration tanks while still producing filtered water through the online tank.

The system can produce approximately 75,000 gallons of water constantly per day. The current embodiment of the programmable logic controller 36 can coordinate five filtration tanks in parallel. The tanks currently producing filtered water and the assembly as shown in FIG. 7 are online tank 1 at 200, online tank 2 at 204, and online tank 3 at 208. The groundwater source line 14 provides the groundwater through an oxidation filtration system control valve 212. The programmable logic controller 36 monitors the operation of the online tanks and if a back flushing sequence occurs or the tank goes off-line, then the PLC will signal the oxidation filtration system control valve 212 to redirect the groundwater from the groundwater source line 14 to the backup system such as backup oxidation filtration system 202 to keep the production output at a constant rate. Also, by having a plurality of filtration tanks in series and parallel, the assembly 250 is in a better position to meet peak load demands and low load demands based on daily population needs.

A brief discussion of the overall process or method as it operates in the current embodiment will now be provided.

Reference will be made to FIGS. 2 through 7 including the alternative embodiments of FIGS. 2A through 4a. Referring first to FIG. 7, the oxidation filtration tank assembly 250 of the current embodiment is arranged in a three parallel output filtration configuration with each parallel output line having 2 filtration tanks in series. The groundwater flows through the groundwater source line 14 and is directed through each of the oxidation filtration system control valves 212 to the online oxidation filtration system tank. Pressure in the source line 14 is provided by the source line pump and the pressure can be read on the pressure meter 20 as seen in FIG. 2. The operator can initiate the filtration process by first turning on the source line valve or port 19 by either utilizing the programmable logic control application 132 through a remote client 133 or by using a manual valve handle. The water is immediately injected into the Venturi-type aerator 15 and after the initial aeration, the groundwater passes through the spray nozzle 16 and falls into the aeration tower upper zone or chamber 23. The groundwater is further aerated by dropping through the aeration tower 24 to the bottom of the tower. The groundwater then after being aerated enters into the lower chamber 47 of the filter tank 46 either through the source water crossover pipe 26 or through the exit port 102 as seen in FIG. 2a. The water level in the filter tank lower chamber 47 and the aeration tower 24 continues to rise at an equal constant rate until the filter tank lower chamber 47 is full. During this initial filling process, the filter tank lower chamber 47 containing the filter media 50 filters the water through the filter media and the filter media is pressed or pressurized against the media mesh 52 dividing the upper chamber from the lower chamber.

At this stage, the source groundwater 12 begins to fully filter through the filter media 50 as the water pressure static head 22 in the aeration tower 24 begins to increase forcing the water through the filter media and beginning the filter rate of the source groundwater through the media until a steady-state flow rate is reached.

The surface area of the individual filter media is such that it readily attracts the iron oxide particles thus taking the particulate out of the groundwater. The aerated water 12 filters through the filter media and enters into the upper chamber 45 of the filtered tank 46. The filtered water contained within the upper chamber 45 will exit through the filtered water crossover pipe 54 or the exit port 54 and dropped into a holding tank 48.

Filtering of the groundwater continues unimpeded for the filtering cycle until such time as the filtration rate through the filter media decreases. As the filter rate slows, the static head pressure 22 in the aerated tower 24 begins to build. At a certain point the static head pressure 22 reaches the high-level float 34 or the diaphragm sensor 107 and then sends a back flush or discharge signal from the back flush sensor 32 or diaphragm sensor 107 to the programmable logic controller 36.

At this point in the process, the programmable logic controller runs the control application 132 for the particular oxidation filtration system 140. Depending on the operational settings held within the various control objects 146 the alarm 111 may be delayed from sounding because the users may have set the high-level delay 162 to for example five minutes. Simultaneously, the control application 132 will send a pager signal 164 through the modem 131 to the remote client 133 which in this case would be the pager of the on-site operator. The pager would then notify the operator of the emergency situation and the operator could take a number of actions. One of the actions would be for the operator to access the control application 132 through the remote client 133 connected to a modem 131. The operator could then check the system status of the particular oxidation filtration system to determine if the alarm signal is an actual high-level emergency or is just a false alarm.

The operator can then verify that the water pressure level 22 in the aeration tower 24 has reached the high-level float 34 or the diaphragm sensor 107 and a back flush or system flush should be initiated. After the back flush has been initiated, the operator can direct the programmable logic 36 to send a signal to the oxidation filtration system control valve or port 212 as seen in FIG. 7, to switch the groundwater source 14 from the back flushing oxidation filtration system 200 to the backup oxidation filtration system 202.

The calibration for the normal back flush time 158 will then take place recalculating the average amount of time between back flushes and reset the back flush time object 148. This recalibration can occur for each of the oxidation filtration systems within the assembly 250.

Figure 3:
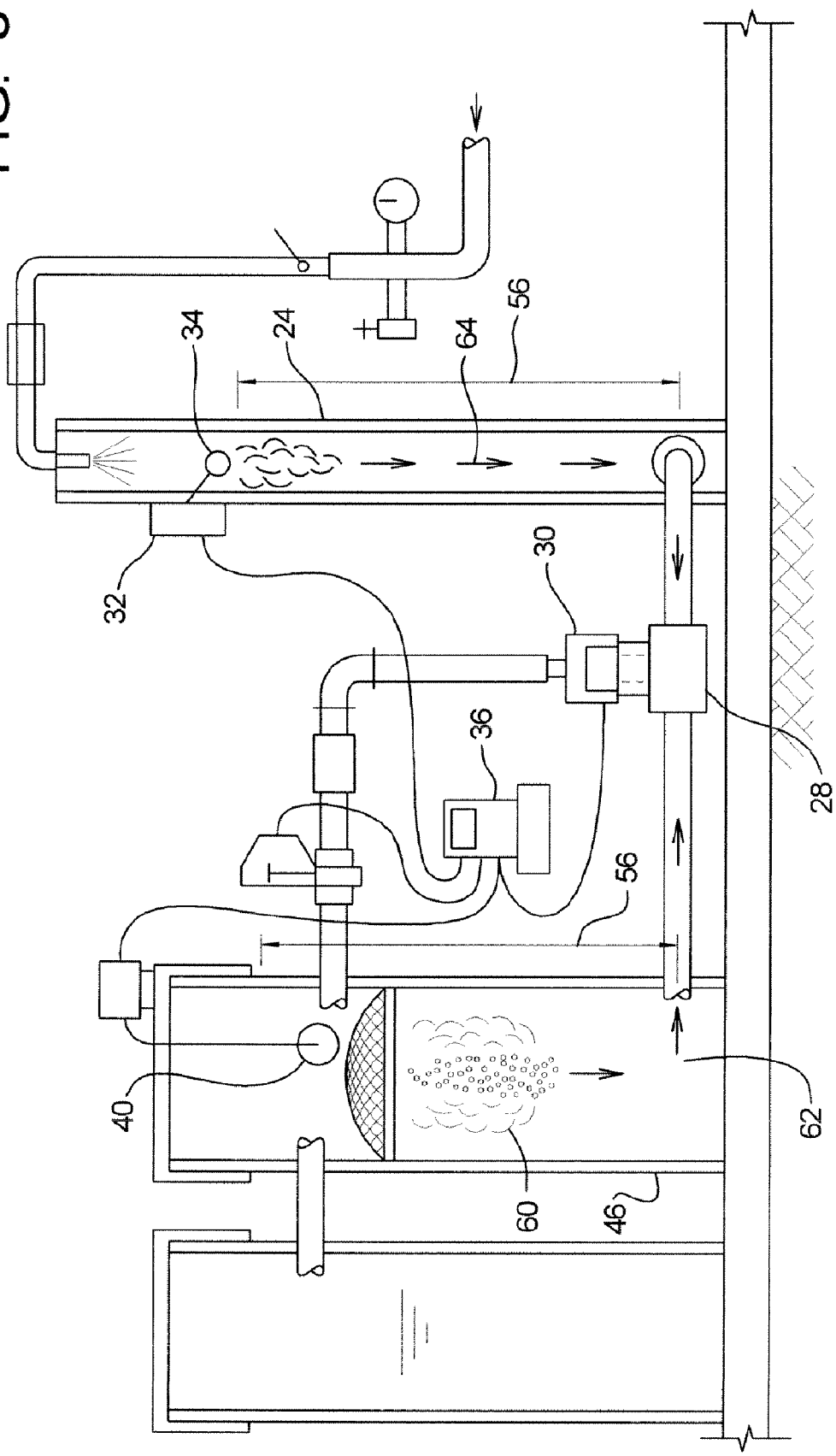
FIG. 3 is an elevation view of the back flushing system.
Figure 3A:
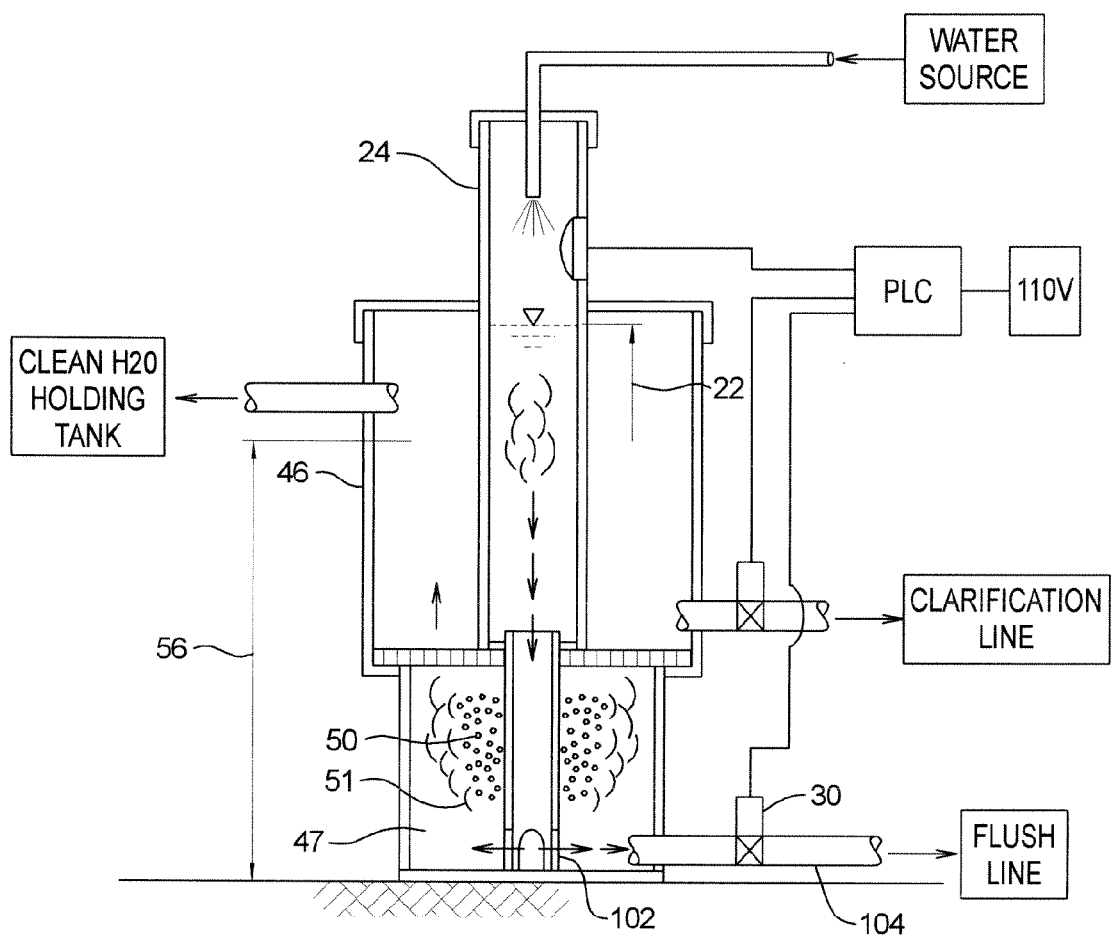
FIG. 3a is an alternative embodiment elevational view of the back flushing system.

The filtration will continue until the back flush time 148 signaled to the programmable logic controller 36 that a back flush cycle 150 should occur. The programmable logic controller will then signal the back flush valve 30. Referring to FIGS. 3 and 3a, the solenoid of the back flush valve 30 will open the valve and the back flushing process will begin again. The static pressure head 22 within the aeration tower 24 as well as the filtered tank static pressure head 56 create a substantially large flow rate through the back flush line 104 and creating significant turbulence 51 in the lower chamber 47 of the filtered tank 46. This turbulence 51 buffets and washes the filter media 50 as the groundwater contained within the aeration tower 24 in the filtration take 46 quickly exit through the back flush line 104.

Figure 4:
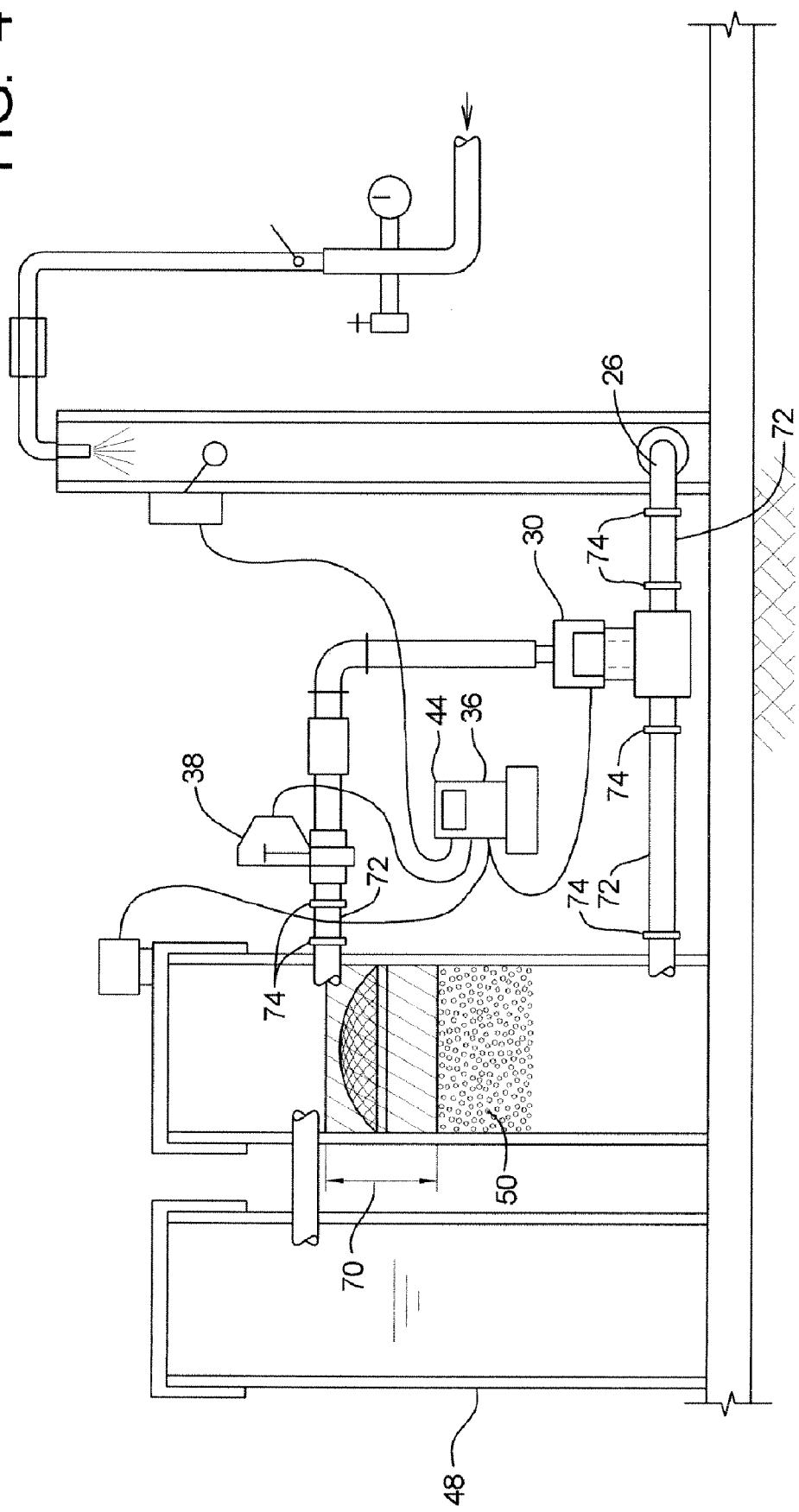
FIG. 4 is an elevation view of the cleansing system.
Figure 4A:
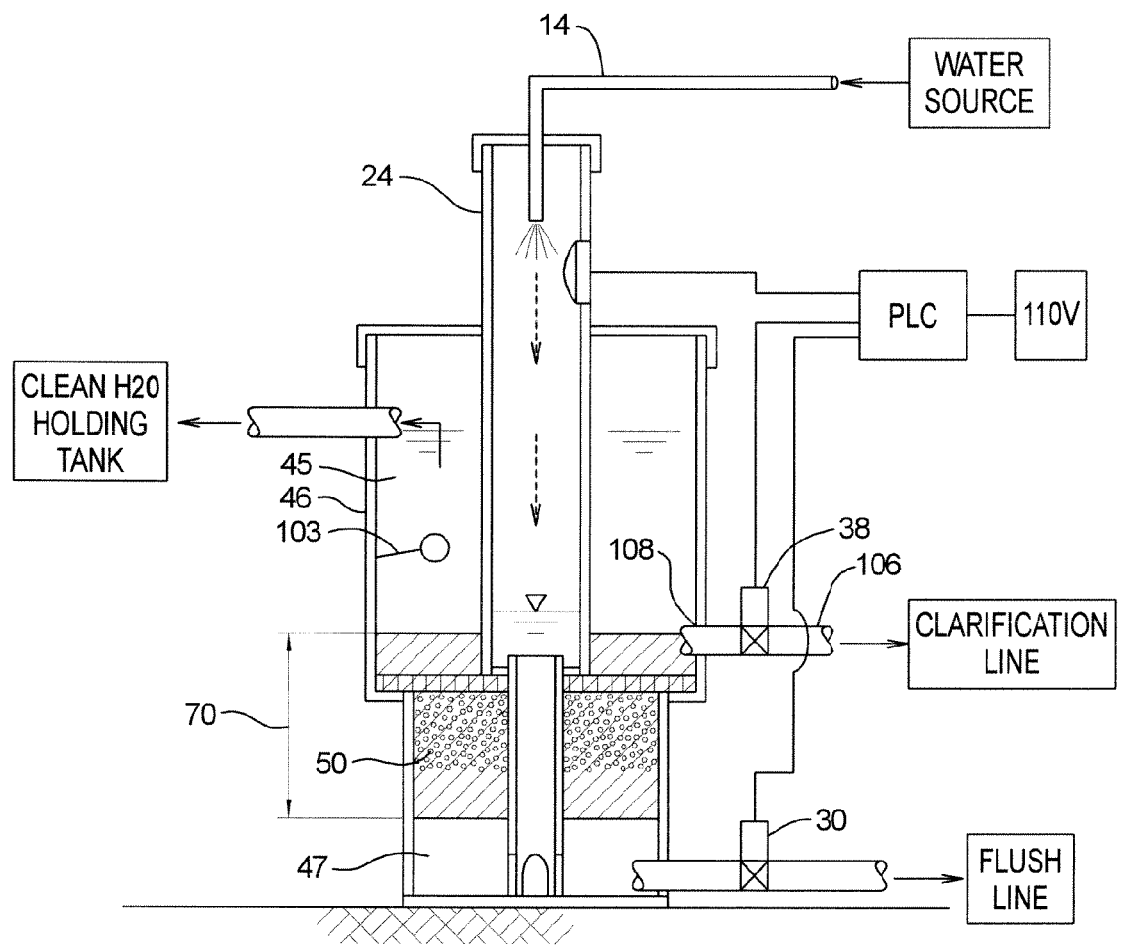
FIG. 4a is an alternative embodiment elevational view of the cleansing system.

This process of back flushing and rinsing the filter media 50 occurs for the entire period of the back flush cycle timer 150 as set in the control application 132. After the time period has elapsed, the programmable logic controller then signals the clarification valve or port 38 as seen in FIGS. 4 and 4a to open and simultaneously closes the back flush valve 30 allowing the water pressure from the source line 14 to accumulate in the aeration [[swap]] tower 24 and the filter tank 46. The filter media 50 has been washed of the oxidation deposits and returns to its buoyant state.

Because of the significant turbulence which occurred in the back flushing process, iron or other particulate is suspended within the groundwater and may be residual in the upper chamber 45 and the lower chamber 47 of the filter tank 46. In lieu of waiting for the dislodged particulate to settle out, a clarification process is provided where the clarification line 108 in the upper chamber 45 is opened by the clarification port 38 to clean and dispose of the cloudy groundwater 70.

The control application runs the clarification cycle for the desired period of time as set in the clarification cycle timer object 152. Alternatively, the particulate sensor 103 can monitor the level of particulate within the upper chamber 45 during the back flushing process to then send a signal to the programmable logic controller that the clarification cycle should begin and then terminate when the particulate levels in the upper chamber diminish to an acceptable filtered level.

However the clarification period 152 is determined, the cloudy water 70 exits through the clarification line 106 for the clarification cycle 52 until the cycle is complete. One embodiment has this cycle lasting approximately 30 minutes. After the clarification cycle is complete, the clarification port 38 is closed by the programmable logic controller sending a signal to the solenoid of the clarification valve or port to close the aperture.

Once the entire flushing cycle has taken place, the groundwater within the aeration tower 24 is allowed to build up pressure head 22 until such time as the filtration rate reaches its normal equilibrium state and filtration of the groundwater continues.

After continuous use of the oxidation filtration tanks 10, such as for a year or two, maintenance of the oxidation filtration back flush assembly or tank 10 may be required. The accumulation of the iron particulate or other crud may occur generally within the crossover pipe 26 or block the exit port 102 as seen in FIGS. 2 and 2a. Consequently, either a plurality of cleanout pipes 72 is provided or cleanout ports within the bottom chamber of the filter tank 46 are provided.

Each cleanout pipe section 72 is attached to a manifold 74 with a gasket 76. When the crossover pipe 26 becomes clogged with particulate, the operator can shut down the system and remove the cleanout pipes 72. Similarly, when the exit port 102 becomes clogged and the aeration tower 24 can no longer pass water from the aeration tower into the lower chamber of the filter tank 47, the operator can shut down the entire process, remove the filter tank cover and extract the aeration tower 24 from the interior of the filter tank. The media mesh 52 can be removed and cleanout of the filter tank and of the aeration tower can occur relatively inexpensively. This use of maintenance allows for long life of the oxidation filtration tank 10.

The invention claimed is:

1. A system for monitoring and cleaning a groundwater oxidation filtration device, the oxidation filtration device having an aeration section and a filtration section, said system comprising:
   a. a controller communicating with a sensor, a filtration section discharge port and a filtration section clarification port,
   b. a filter rate corresponding to a filter pressure and a filter period, a discharge rate corresponding to a discharge pressure and a discharge period, clarification rate corresponding to a clarification pressure and a clarification period,
   c. the sensor sending to the controller a discharge signal to open the filtration section discharge port after reading the one or more of the following:
      i. a decrease in the filter rate,
      ii. an increase in the filter pressure,
      iii. an end to the filter period,
   d. the sensor signaling the controller to close the filtration section discharge port and open the filtration section clarification port after reading one or more of the following:
      i. a decrease in the discharge rate,
      ii. a decrease in the discharge pressure,
      iii. an end to the discharge period,
   e. the sensor signaling the controller to close the filtration section clarification port and resume filtration after reading one or more of the following:
      i. a decrease in the clarification rate,
      ii. a decrease in the clarification pressure,
      iii. an end to the clarification period.

2. The system according claim 1 wherein said sensor is further comprised of one or more of the following:
   a. a high-level water sensor configured to communicate a discharge signal to said controller to open said discharge port,
   b. a low-level water sensor configured to communicate a clarification signal to the controller to close said discharge port and open said clarification port,
   c. a clarification water sensor configured to communicate a filtration signal to the controller to close the clarification port and resume filtering,
   d. a particulate sensor configured to communicate one or more of the following signals to the controller:
      i. a discharge signal,
      ii. a clarification signal,
      iii. a filtration signal.

3. The system according claim 2 wherein said controller is further comprised of a programmable logic controller having a plurality of controller components including a power button to power on and off the system, a manual back flush switch to manually open the discharge port, a periodic back flush timer to periodically backflush the system, a back flush timer to back flush the filtration section for a specified time period, a clarification flush timer to clarify the filtration section for a specified time period, a communications component to enable the controller to communicate with a remote client.

4. The system according to claim 3 wherein said discharge signal to the programmable logic controller includes one or more of the following:
   a. a signal from the periodic back flush timer,
   b. a signal from the high level water float sensor,
   c. a signal from the high level water diaphragm sensor,
   d. a signal from the remote client component,
   e. a signal from the particulate sensor,
   f. a signal from the manual back flush switch.

5. The system according to claim 3 wherein said clarification signal to the programmable logic controller includes one or more of the following:
   a. a signal from the back flush timer,
   b. a signal from a low level water float sensor,
   c. a signal from a low level water diaphragm sensor,
   d. a signal from the remote client component.

6. The system according to claim 3 wherein said filtration signal to the programmable logic controller includes one or more of the following:
   a. a signal from the particulate sensor,
   b. a signal from the clarification timer,
   c. a signal from the remote client component,
   d. a signal from a low level water float sensor,
   e. a signal from a low level water diaphragm sensor.

7. The system according to claim 2 wherein said high-level water sensor is positioned within said aeration section and configured to communicate a discharge signal to said controller when the groundwater in said aeration section rises to a predetermined level.

8. The system according to claim 2 wherein said low-level water sensor is positioned within said filtration section and configured to communicate a clarification signal to the controller when the water in said filtration section reaches a predetermined level.

9. The system according to claim 2 wherein said clarification water sensor is positioned within said filtration section and configured to send a filtration signal to the controller when the water in the filtration section reaches a predetermined level.

10. The system according to claim 2 wherein said particulate sensor is positioned within said filtration section and configured to communicate a discharge signal to said controller when the particulate in the filtered groundwater reaches a predetermined level.

11. The system according to claim 2 wherein said particulate sensor is positioned within said filtration section and configured to communicate a clarification signal to said controller when the particulate in the filtration section reaches a predetermined level during back flush.

12. The system according to the claim 2 wherein said particulate sensor is positioned within said filtration section and configured to communicate a filtration signal to said controller when the particulate in the filtration section reaches a predetermined level during the clarification.

13. A system for monitoring and cleaning a groundwater oxidation filtration device, the oxidation filtration device having an aeration section and a filtration section, said system comprising:
   a. a programmable logic controller communicating with a sensor, a filtration section discharge port and a filtration section clarification port said programmable logic controller further having a plurality of controller components including a power button to power on and off the system, a manual back flush switch to manually open the discharge port, a periodic back flush timer to periodically backflush the system, a back flush timer to back flush the filtration section for a specified time period, a clarification flush timer to clarify the filtration section for a specified time period, a communications component to enable the controller to communicate with a remote client,
b. a filter rate corresponding to a filter pressure and a filter period, a discharge rate corresponding to a discharge pressure and a discharge period, clarification rate corresponding to a clarification pressure and a clarification period,
c. said sensor further comprised of one or more of the following:
 i. a high-level water sensor configured to communicate a discharge signal to said controller to open said discharge port,
 ii. a low-level water sensor configured to communicate a clarification signal to the controller to close said discharge port and open said clarification port,
 iii. a clarification water sensor configured to communicate a filtration signal to the controller to close the clarification port and resume filtering,
 iv. a particulate sensor configured to communicate one or more of the following signals to the controller, a discharge signal, a clarification signal, a filtration signal,
d. the sensor sending to the controller a discharge signal to open the filtration section discharge port after reading the one or more of the following:
 i. a decrease in the filter rate,
 ii. an increase in the filter pressure,
 iii. an end to the filter period,
e. the sensor signaling the controller to close the filtration section discharge port and open the filtration section clarification port after reading one or more of the following:
 i. a decrease in the discharge rate,
 ii. a decrease in the discharge pressure,
 iii. an end to the discharge period,
f. the sensor signaling the controller to close the filtration section clarification port and resume filtration after reading one or more of the following:
 i. a decrease in the clarification rate,
 ii. a decrease in the clarification pressure,
 iii. an end to the clarification period.

14. An oxidation filtration system to remove dissolved solvents from groundwater, said system comprising:
a. an aeration section configured to aerate said groundwater, a filtration section configured to filter said groundwater;
b. a controller configured to vary the rate at which the groundwater enters the aeration section, the rate at which the aerated groundwater filters through the filter section, the rate at which the filtered groundwater exits the filter section;
c. the controller further configured to back flush the oxidation filtration system, clarify the oxidation filtration system, and resume aerating and filtering the groundwater;
d. said filtration section arranged in a cylindrical configuration having an outer filtration diameter and a filtration height;
e. said aeration section arranged in a cylindrical configuration having an outer aeration diameter less than said outer filtration diameter and having an aeration height greater than said filtration height, said aeration section being substantially diametrically contained within said filtration section outer filtration diameter.

15. The system according to claim 14 wherein:
a. said aeration section further comprises an upper groundwater entry port to accept the groundwater, a lower aeration section exit port to discharge the aerated groundwater into the filtration section, a high level water sensor to signal the controller to backflush the filtration section;
b. said filtration section further comprises an upper chamber and a lower chamber, said lower chamber arranged to accept aerated water from said aeration section exit region, said filtration section upper chamber and lower chamber separated by a filtration screen, said lower chamber further comprising a discharge port, a buoyant filter media, said upper chamber further comprising a clarification port, a filtration port, and a filtration section sensor.

16. The system according to claim 15 wherein, said controller further comprises:
a. a programmable logic controller communicating with said high level water sensor, said filtration section sensor, said discharge port and said clarification port;
b. said programmable logic controller further having a plurality of controller components including a power button to power on and off the system, a manual back flush switch to manually open the discharge port, a periodic back flush timer to periodically backflush the system, a back flush timer to back flush the filtration section for a specified time period, a clarification timer to clarify the filtration section for a specified time period, a communications component to enable the controller to communicate with a remote client;
c. the controller operating the discharge port after receiving one or more of the following:
 i. a signal from the highlevel water sensor;
 ii. a signal from the manual back flush switch;
 iii. a signal from the periodic backflush timer;
 iv. a discharge signal from the remote client;
d. the controller closing the discharge port and opening the clarification port after receiving one or more of the following:
 i. a signal from the backflush timer;
 ii. a clarification signal from the remote client;
 iii. a signal from a filtration section sensor;
e. the controller closing the clarification port and resuming filtration after receiving one or more of the following:
 i. a signal from the clarification timer;
 ii. a filtration signal from the remote client;
 iii. a signal from the filtration section sensor.

17. An oxidation filtration system to remove dissolved solvents from groundwater, said system comprising:
a. an aeration section configured to aerate said groundwater, said aeration section further comprising:
 i. a cylindrical configuration having an outer aeration diameter, an aeration height, said aeration section being substantially contained within said filtration section;
 ii. an upper groundwater entry port to accept the groundwater, a lower aeration section exit port to discharge the aerated groundwater into the filtration section, a high level water sensor to signal a controller to backflush the filtration section;
b. a filtration section configured to filter said groundwater, said filtration section comprising:
 i. a cylindrical configuration having an outer filtration diameter greater than said aeration section, a filtration height less than said aeration section;

ii. an upper chamber and a lower chamber, said lower chamber arranged to accept aerated water from said aeration section exit port, said filtration section upper chamber and lower chamber separated by a filtration screen, said lower chamber further comprising a discharge port, a buoyant filter media, said upper chamber further comprising a clarification port, a filtration port, and a filtration section sensor;

c. a programmable logic controller communicating with said high level water sensor, said filtration section sensor, said discharge port and said clarification port;

d. said programmable logic controller further having a plurality of controller components including a power button to power on and off the system, a manual back flush switch to manually open the discharge port, a periodic back flush timer to periodically backflush the system, a back flush timer to back flush the filtration section for a specified time period, a clarification timer to clarify the filtration section for a specified time period, a communications component to enable the controller to communicate with a remote client;

e. the controller operating the discharge port after receiving one or more of the following:
   i. a signal from the highlevel water sensor;
   ii. a signal from the manual back flush switch;
   iii. a signal from the periodic backflush timer;
   iv. a discharge signal from the remote client;

f. the controller closing the discharge port and opening the clarification port after receiving one or more of the following:
   i. a signal from the backflush timer;
   ii. a clarification signal from the remote client;
   iii. a signal from a filtration section sensor;

g. the controller closing the clarification port and resuming filtration after receiving one or more of the following:
   i. a signal from the clarification timer;
   ii. a filtration signal from the remote client;
   iii. a signal from the filtration section sensor.

18. An assembly of oxidation filtration units to remove dissolved solvents from groundwater, said assembly comprising:

a. a plurality of oxidation filtration units, each unit configured for an online operation, a flushing operation, and an off-line operation;

b. each unit having an aeration section and a filtration section, said aeration section provided groundwater through a groundwater source line, said filtration section filtering the aerated water from said aeration section through a filter medium and storing the filtered groundwater in a storage section;

c. at least one controller to orchestrate the online operation, flushing operation, and off-line operation of said plurality of oxidation filtration units, said controller having with each unit communication with a sensor, a filtration section discharge port, a filtration section clarification port and a groundwater source valve, said controller having further communication with a remote client to remotely operate the controller;

d. each unit having a filter rate corresponding to a filter pressure, a filter period and a filter timer, a discharge rate corresponding to a discharge pressure, a discharge period and a discharge timer, clarification rate corresponding to a clarification pressure, a clarification period and a clarification timer;

e. the controller initiating the flushing operation of a unit by opening the discharge port after receiving one or more of the following:
   i. a highlevel water signal from the sensor;
   ii. a manual discharge signal from the remote client;
   iii. a periodic discharge signal from the filter timer;
   iv. a discharge signal from the remote client;

f. the controller continuing the flushing operation of a unit by closing the discharge port and opening the clarification port after receiving one or more of the following:
   i. a clarification signal from the discharge timer;
   ii. a clarification signal from the remote client;
   iii. a low level water signal the sensor;

g. the controller ending the flushing operation and starting the on-line operation of a unit by closing the clarification port and resuming filtration after receiving one or more of the following:
   i. a filtration signal from the clarification timer;
   ii. a filtration signal from the remote client;
   iii. a filtration signal from the sensor;

h. the controller ending the online operation and starting the off-line operation of a unit by operating the ground water source valve of the unit after receiving one or more of the following:
   i. an off-line signal from the remote client;
   ii. a manual offline signal from the on-off switch.

19. A method for monitoring and cleaning a groundwater oxidation filtration device, the oxidation filtration device having an aeration section and a filtration section, said method comprising:

a. communicating signals between a controller, a sensor, a filtration section discharge port and a filtration section clarification port, b. providing in the oxidation filtration device a filter rate corresponding to a filter pressure and a filter period, a discharge rate corresponding to a discharge pressure and a discharge period, clarification rate corresponding to a clarification pressure and a clarification period, c. sending a discharge signal from the sensor to the controller and opening the filtration section back flush port after sensing one or more of the following:
   i. decreasing of the filter rate,
   ii. increasing of the filter pressure,
   iii. ending of the filter period, d. sending a signal from the sensor to the controller and to close the filtration section back flush port and open the filtration section clarification port after sensing one or more of the following:
   i. decreasing of the discharge rate,
   ii. decreasing of the discharge pressure,
   iii. ending of the discharge period, e. sending a close signal from the sensor to the controller to close the filtration section clarification port and resume filtration after sensing one or more of the following:
   i. decreasing of the clarification rate,
   ii. decreasing of the clarification pressure,
   iii. ending of the clarification period.

* * * * *